United States Patent Office 3,468,898
Patented Sept. 23, 1969

3,468,898
BRIDGED BIS-BIGUANIDES AND
BIS-GUANIDINES
Royal A. Cutler, Sand Lake, and Samuel Schalit, Albany,
N.Y., assignors to Sterling Drug Inc., New York, N.Y.,
a corporation of Delaware
No Drawing. Continuation-in-part of application Ser. No.
358,614, Apr. 9, 1964. This application May 26, 1966,
Ser. No. 553,044
Int. Cl. C07c *129/16;* C07f *15/06,* A61k *27/00*
U.S. Cl. 260—301                    25 Claims

ABSTRACT OF THE DISCLOSURE 1,1'-bridged - bis[5 - higher-alkylbiguanides] and 1,1'-bridged-bis[3-higher-alkylguanidines] are useful biocidal and biostatic agents for applicatiin to living and non-living surfaces.

This application is a continuation-in-part of our prior copending application Ser. No. 358,614, filed Apr. 9, 1964, now abandoned.

This invention relates to novel bridged bis-biguanides and bridged bis-guanidines.

More particularly the novel compounds of the instant invention are 1,1'-bridged-bis[5-higher-alkylbiguanides] and 1,1'-bridged-bis[3-higher-alkylguanidines] represented in the free base form by the following structural formula:

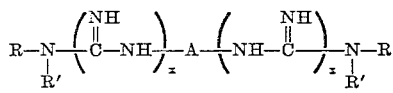

Formula I wherein: the bivalent bridge A is a member of the group consisting of:
(a) alkylene of from 2 to 12 carbon atoms having the valence bonds attached to different carbon atoms,
(b) —(CH$_2$)$_m$—Y—(CH$_2$)$_n$— wherein $m$ and $n$ each represent an integer from 2 to 6 and Y is a member of the group consisting of O and S,
(c)

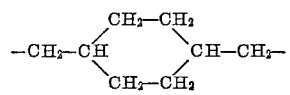

(d)

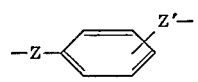

wherein Z and Z' are each alkylene of from 1 to 3 carbon atoms,
(e)

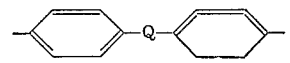

wherein Q is a member of the group consisting of —O—, —S—, —SO— and —SO$_2$—, and
(f)

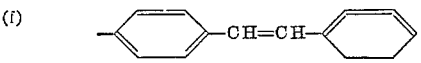

R is a member of the group consisting of
(a) alkyl of from 6 to 16 carbon atoms, and
(b) alkyl-Y-alkylene, wherein Y is a member of the group consisting of O and S;
R' is a member of the group consisting of H and lower-alkyl; and
$x$ is an integer from 1 to 2.

The compounds of this invention have biocidal and biostatic properties and are particularly useful as antibacterial, antifungal, and antiviral agents for application to living surfaces of animals and plants and to non-living surfaces by conventional swabbing, padding, dusting, spraying, immersing, rinsing, and the like techniques. Depending on the particular purpose involved, the compounds are used in aqueous solution, as in water or in aqueous detergent solutions, or in the form of solutions in organic solvents, or in dusting powders.

In Formula I above, when representing an alkylene bridge of from 2 to 12 carbon atoms, A has the formula C$_n$H$_{2n}$ (wherein $n$ is an integer from 2 to 12), is bivalent, and has free valence bonds on different carbon atoms. The preferred bivalent alkylene bridge is polymethylene, represented by —(CH$_2$)$_n$— or equivalently by

—(CH$_2$)$_{2-12}$— but it also includes branched-chain alkylene bridges. Thus in this sense, A includes the alpha,omega-divalent unbranched radicals ethylene, trimethylene, tetramethylene, pentamethylene, hexamethylene, heptamethylene, octamethylene, nonamethylene, decamethylene, undecamethylene, and dodecamethylene, and also includes for example the branched divalent radicals 1,3-propylene, 1,4-pentylene, 1,10-dodecamethylene, 2-methyl-1,4-butylene, 2-methyl-1,5-pentylene, and the like.

When representing the bridged grouping

—(CH$_2$)$_m$—Y—(CH$_2$)$_n$—

A is an oxa- or thia-polymethylene radical containing from 5 to 13 atoms. The terms $m$ and $n$ can be the same or different, and each represents an integer of from 2 to 6. The term Y represents —O— or —S—. In this sense, therefore, A includes such radicals as

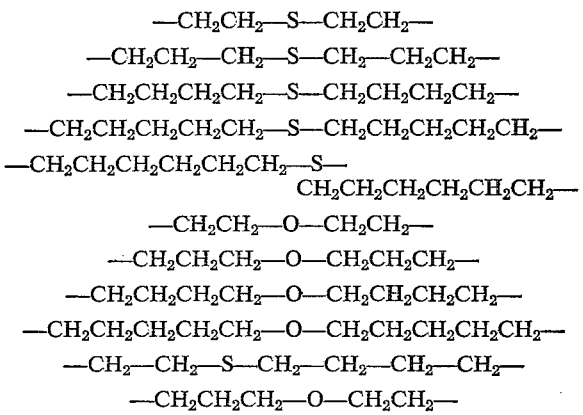

and the like.

When A represents bridging groups (d) through (f), each of which contains one or more benzene rings, the said benzene rings can be unsubstituted or can be substituted with up to four inert substituents exemplified by, but not limited to, lower-alkyl, halogen (fluorine, chlorine, bromine, or iodine) lower-alkoxy, nitro, and hydroxy.

When representing the radical

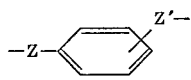

A is a divalent phenylene-bis(lower-alkylene) group. The terms Z and Z' can be the same or different and represent alkylene radicals of from 1 to 3 carbon atoms. Moreover the Z and Z' radicals can be in any of the ortho-, meta-, or para-positions relative to each other. Because of their ready availability, particularly preferred 1,4-phenylenebis(lower-alkylene) groups are 1,2-, 1,3- or 1,4-xylylene and halo- and alkyl-substituted 1,2-, 1,3- and 1,4-xylylene. In this sense, therefore, A includes 2,3,5,6-tetramethyl-1,4-phenylene-bis(methylene), 2,5-dimethyl-1,4-phenylenebis(methylene), 2-chloro-1,4-phenylenebis(methylene), 2, 3,5,6-tetrachloro-1,4-phenylenebis(methylene), 1,2-phenylenebis(methylene), 1,3-phenylenebis(methylene), and 1,4-phenylenebis(methylene), and also 2-methyl-1,4-phenylenebis(ethylene), 1,4-phenylenebis(propylene),

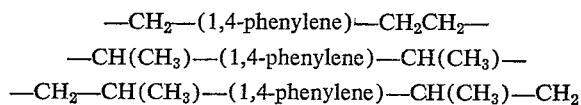

and the like.

In the above general Formula I, R is a member of the group consisting of alkyl of from 6 to 16 carbon atoms and lower-alkyl-Y-lower-alkylene, wherein Y, as above, is —O— or —S—. When representing an alkyl group of from 6 to 16 carbon atoms, R is a straight- or branched-chain saturated monovalent aliphatic radical. Thus, R includes n-hexyl, n-heptyl, n-octyl, n-nonyl, n-decyl, n-undecyl, n-dodecyl, n-tetradecyl, n-hexadecyl, 2-ethyl-1-hexyl, 2-heptyl, 2-octyl, 1,1,3,3-tetramethylbutyl, and the like.

When representing an alkyl-Y-alkylene radical, R is an oxa- or thia-interrupted alkyl group of from 6 to 16 atoms. The alkyl and alkylene radicals together contain from 5 to 15 carbon atoms, and Y is —O— or —S—. Particularly preferred alkyl-Y-alkylene groups are those wherein the alkylene moiety is propylene because of the ease of preparing the requisite alkylmercapto- and alkoxyamine intermediates from acrylonitrile by methods well-known in the art. When representing alkyl-Y-alkylene, R is thus exemplified by 3-(ethoxy)propyl, 3-(butoxy)propyl, 3-(pentoxy)propyl, 6-(propyloxy)hexyl, 3-(hexylmercapto)propyl, 3-(butylmercapto)propyl, 5-(pentylmercapto)pentyl, 7-(methoxy)heptyl, 6-(pentoxy)hexyl, 3-(tridecyloxy)propyl, 3-(dodecylmercapto)propyl, and the like.

In the above general Formula I, R' is H or lower-alkyl. When representing lower-alkyl, R is a straight- or branched-chain saturated aliphatic radical which contains from one to six carbon atoms. The group R' thus includes, H, methyl, ethyl, n-propyl, isopropyl, n-butyl, isobutyl, tert-butyl, n-amyl, n-hexyl, and the like.

The term $x$ in general Formula I is 1 or 2. When $x$ represents the integer 1, the compounds are bridged-bis[guanidines], and when representing 2, the compounds are bridged-bis[biguanides].

In free base form the compounds of this invention interact with one or two equivalents of an organic or inorganic acid to form the corresponding mono- or di-acid-addition salts. These acid-addition salts and the free bases of course have the common structural entity represented by the structural Formula I. The acid-addition salts are the full equivalents of the free base forms, and the new compounds of this invention include both the free bases and the acid-addition salts thereof. The novel feature of the compounds of the invention thus resides in the concept of the bases and cationic forms of the new 1,1' - bridged-bis(5 - higher-alkylbiguanides) and 1,1'-bridged-bis(3-higher-alkyl guanidines) and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. It will be appreciated that in aqueous solutions the base form and the water-soluble acid-addition salt form of the compounds of the invention possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and poly-carboxylic acids such as found, for example, in Beilstein's Organische Chemie, 4th ed., volumes III, IV, IX, X, XIV, XVII, XIX, XXI, XXII, and XV; organic mono- and polysulfonic and -sulfinic acids such as found, for example in Beilstein, volumes VI, XI, XVI, and XXII; organic phosphonic and phosphinic acids such as found, for example, in Beilstein, volumes XI and XVI; organic acids of arsenic and antimony such as found, for example in Beilstein, volume XVI; organic heterocyclic carboxylic, sulfonic, and sulfinic acids such as found, for example, in Beilstein, volumes XVIII, XXII, and XXV; acidic ion-exchange resins; and inorganic acids of any acid forming element or combination of elements such as found in Mellor, Comprehensive Treatise on Inorganic and Theoretical Chemistry, Longman's Green and Co., New York, N.Y., volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds such as found, for example, in volume VI of Beilstein, acidic compounds having "activated" or acidic hydrogen atoms, as for example, picrolonic acid, or barbituric acid derivatives having an acidic proton such as found, for example, in Cox et al. Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example boron trifluoride.

Representative acids for the formation of the acid-addition salts include formic acid, acetic acid, isobutyric acid, alpha-mercaptopropionic acid, trifluoroacetic acid, malic acid, fumaric acid, succinic acid, succinamic acid, glutamic acid, tartaric acid, oxalic acid, pyromucic acid, pamoic acid, citric acid, lactic acid, glycolic acid, gluconic acid, saccharic acid, ascorbic acid, penicillin, benzoic acid, phthalic acid, salicylic acid, acetylsalicylic acid, 3,5-dinitrobenzoic acid, anthranilic acid, cholic acid, 2-pyridinecarboxylic acid, 3-hydroxy-2-naphthoic acid, picric acid, quinic acid, tropic acid, 3-indoleacetic acid, barbituric acid, sulfamic acid, methanesulfonic acid, ethanesulfonic acid, isethionic acid, benzenesulfonic acid, p-toluenesulfonic acid, saccharin, butylarsonic acid, methanephosphonic acid, acidic resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, arsenic acid, and the like.

The acid-addition salts are prepared in conventional fashion, for instance either by direct mixing of the acid and the base or, when this is not appropriate, by dissolving either or both of the acid and the base separately in water or an organic solvent and mixing the two solutions, or by dissolving both the acid and the base together in a solvent. The resulting acid-addition salt is isolated by filtration, if it is insoluble in the reaction medium, or by evaporation of the reaction medium to leave the acid-addition salt as a residue.

The mono- and di-acid-addition salts of the bases of Formula I are useful not only as biocidal and biostatic agents but are also useful as characterizing or identifying derivatives of the free bases and in isolation or purification procedures. Moreover, the acid-addition salts react with strong bases, such as alkali metal hydroxides, to generate the free bases; and accordingly all of the salts, regardless of considerations of solubility, toxicity, physical form, or the like of a particular species of acid-addition salt, are useful for the purposes of our invention since they are sources of the free bases.

It will be appreciated from the above that if one or more of the characteristics, such as solubility, molecular weight, physical appearance, toxicity, or the like of a given acid-addition salt render it less suitable or unsuitable for the particular desired purpose, as for example, use as an antibacterial agent or antifungal agent or in an isolation or purification procedure, or the like, the acid-addition salt can be converted to the free base and then to another, more suitable acid-addition salt, for instance, a pharmaceutically-acceptable salt when a pharmaceutical use is involved.

The 1,1'-bridged-bis(5-higher-alkyl biguanides) of our invention form stable coordination compounds with certain metallic salts. The resulting complexes have antibacterial properties equivalent to those of the uncomplexed bridged-bis(biguanides). The bis[biguanide] coordination compounds with any of the heavier metal ions known in the art to exhibit coordination valence properties are prepared by a process which comprises interacting the bis(biguanide) compound, either in the free base form or in form of the acid-addition salt, with an excess of the desired metal salt. The ratio of the content of bis(biguanide) to metallic ion in the resulting complex depends upon the coordination valence of the particular metallic ion. When the anion of the bis(biguanide) acid-addition salt and the particular metal salt used are not the same, we have found it convenient to conduct the reaction in presence of an excess of alkali metal hydroxide (e.g., sodium hydroxide) whereupon the coordination compound is formed as the hydroxide, which in most instances is very slightly soluble and is easily isolated. Examples of suitable heavier metallic ions which form complexes of this type with our novel bis(biguanides) include V(IV), Cr(III), Mn(III), Mn(IV), Co(II), Co(IV), Ni(II), Cu(II), Zn(II), Pd(II), Re(V), and Os(VI).

The new compounds of our invention illustrated in Formula I wherein $x$ is 2, that is, are conveniently obtained by the process which comprises interacting a 1,1'-bridged-bis(3-cyanoguanidine) having the structural formula

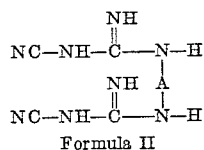

Formula II with approximately two molecular proportions of an alkyl- or dialkylamine having the structural formula

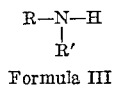

Formula III in the form of a suitable acid-addition salt, for example the hydrochloride, wherein A, R and R' have the same respective meanings stated hereinabove. This process is carried out by heating the reactants together, either in the presence of an inert diluent such as 2-ethoxyethanol, 2-methoxyethanol, o-dichlorobenzene, and the like, or as a melt without a diluent. We have found that it is generally convenient and satisfactory to fuse a mixture of the 1,1'-bridged-bis(3-cyanoguanidine) (Formula II) and the hydrochloride of the amine (Formula III) in a wax or oil bath at a temperature of 125–175° until the reaction is complete. The reaction product, which is the dihydrochloride salt form of a 1,1'-bridged-bis(5-higher-alkyl biguanide) of Formula I ($x=2$), generally has low solubility in water and is readily isolated by adding water and collecting the product on a filter.

If desired, the bis(acid-addition salt) is converted to the corresponding free base form of Formula I by treatment with two molecular equivalents of a strong base such as sodium hydroxide. This free base can be used as such, or can be converted to any other desired acid-addition salt. Alternatively, the acid-addition salt form can be converted to a different acid-addition salt form by treating a solution of the original bis[biguanide] acid-addition salt with an ion exchange resin according to known methods.

In accordance with another feature of this invention, another method for preparing our new bis[biguanide] compounds is provided which comprises interacting a suitable acid-addition salt, such as the dihydrochloride, of an alkylenediamine having the structural formula $$H_2N-A-NH_2$$

Formula IV with approximately two molecular proportions of a 1-(higher-alkyl)-3-cyanoguanidine having the structural formula

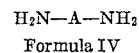

Formula V wherein A, R, and R' have the same respective meanings stated hereinabove. This process is conveniently carried out by heating the reactants together, preferably in the presence of an inert diluent such as nitrobenzene, or the free base form of the diamine, the higher-alkyl cyanoguanidines, and pyridine hydrochloride, is heated in pyridine solution. The reaction product, the dihydrochloride of a base of Formula I, generally has low solubility in the solvent and is readily isolated by conventional means, as by collecting on a filter.

In each of the above preparative procedures, the cyanoguanidine reactant can be replaced by the corresponding amidino-O-(alkyl)urea prepared from the cyanoguanidine compound by reacting the latter with an alkanol in the presence of dry hydrogen chloride according to known methods.

The 1,1'-bridged-bis(3-cyanoguanidines) (Formula II) and the higher-alkylamines (Formula III) used as starting materials in the first of the foregoing methods for preparing our new compounds and the bridged-diamines (Formula IV) employed in the second method of preparation are all old known classes of compounds, being readily prepared by known methods. For instance, the 1,1'-bridged-bis(3-cyanoguanidines) (Formula II) are obtained conveniently by interaction of the appropriate bridged-diamine (Formula IV) dihydrochloride with two molecular proportions of sodium dicyanamide in boiling butanol.

The 1-higher-alkyl-3-cyanoguanidines of Formula V are a known class of compounds and are prepared by interacting approximately equimolecular amounts of an appropriate higher-alkylamine (Formula III) acid-addition salt, such as the hydrochloride, and an alkali metal dicyanamide, such as sodium dicyanamide or potassium dicyanamide, in accordance with the following equation:

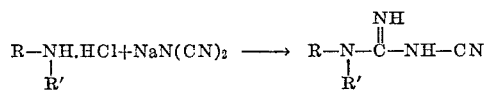

Formula VI

For example, the higher-alkylamine (Formula III) hydrochloride (or alternatively equivalent amounts of the higher-alkylamine and hydrogen chloride, as hydrochloric acid) and sodium dicyanamide are heated in a reaction medium of water, and the resulting product, which precipitates from solution, is isolated by filtration.

The compounds of Formula I wherein $x$ is 1, that is, 1,1'-bridged-bis(3-higher-alkylguanidines) are conveniently prepared by the process which comprises interacting an N-higher-alkyl-S-alkylisothiuronium halide of the structural formula

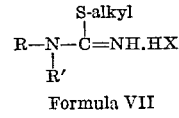

Formula VII with a bridged-amine of Formula IV, wherein R and R' are as above and X is halogen. The process is carried out by heating the reactants together either in the presence of an inert diluent such as a lower-alkanol, e.g., ethanol, isopropyl alcohol, isoamyl alcohol, and the like, or as a melt in the absence of a diluent. We have found it generally convenient to reflux a mixture of the bridged amine and an N-higher-alkyl-S-ethylisothiuronium halide in isoamyl alcohol until the reaction is complete. The reaction product, which is the dihydrohalide of a 1,1'-bridged-bis-(3-higher-alkylguanidine) of Formula I ($x=1$) can be precipitated from the isoamyl alcohol solution by the addition of ether and is readily isolated.

If desired, the dihydrohalide salt form is converted to the corresponding free base form of Formula I by treatment with two molecular proportions of a strong base such as sodium hydroxide. The free base can be used as such or can be converted to any other desired acid-addition salt form. Alternatively, the dihydrohalide salt form can be converted to a different acid-addition salt by treating a solution of the dihydrohalide with a suitable ion-exchange resin according to known methods.

The N-higher-alkyl-S-alkyl isothiuronium halides used as starting materials for preparing our new compounds comprise a known class of compounds, being readily prepared by known methods. For instance, the N-higher-alkyl-S-ethylisothiuronium iodides are conveniently obtained by the interaction of ethyl iodide with the corresponding N-higher-alkylthioureas, which in turn are prepared by heating the thiocyanate salts of amines of Formula III above, according to methods described in the art. Alternatively, the thioureas can be obtained by reacting ammonia with the corresponding higher-alkyl isothiocyanate. The higher-alkyl isothiocyanates in their turn are prepared by known methods from the higher-alkyl-amines and thiophosgene.

As indicated hereinabove, the compounds of this invention are useful antibacterial and antifungal agents. Thus, when tested by standard serial dilution procedures, they were found to have high bactericidal, bacteriostatic, fungicidal, and fungistatic activity in vitro, for instance against *Staphylococcus aureus, Eberthella typhi, Clostridium welchii, Pseudomonas aeruginosa, Trichophyton mentagraphytes, Aspergillus niger,* and *Monilia albicans.* The outstanding antibacterial and antifungal activity of our new bis[biguanide] compounds was unexpected in view of the relatively poor activity found in the lower-alkyl bis[biguanide] compounds in the art. The following table illustrates the high degree of bacteriostatic, bactericidal, fungistatic and fungicidal activity possessed by our higher alkyl compounds containing a hexamethylene bridge in comparison with the activities of the corresponding lower-alkyl compounds represented by the corresponding known n-butyl species:

TABLE $$R-NH-\overset{NH}{\underset{\parallel}{C}}-NH-\overset{NH}{\underset{\parallel}{C}}-NH(CH_2)_6-NH-\overset{NH}{\underset{\parallel}{C}}-NH-\overset{NH}{\underset{\parallel}{C}}-NH-R.2HCl$$

| | In vitro Antibacterial Activity | | | | In vitro Antifungal Activity | | |
|---|---|---|---|---|---|---|---|
| | Bacteriostatic / Bactericidal in p.p.m. | | | | Fungistatic / Fungicidal in p.p.m. | | |
| | Staph. aureus | E. typhi | Cl. welchii | Ps. aeruginosa | T. mentagraphytes | As. niger | M. albicans |
| n-Hexyl | 0.25 | 1.0 | 2.5 | 10 | 1.0 | 100 | 1.0 |
| | 1.0 | 2.5 | 2.5 | 25 | 10 | 100 | 1.0 |
| n-Heptyl | 0.50 | 0.5 | 5.0 | 5.0 | 1.0 | 100 | 1.0 |
| | 0.50 | 2.5 | 5.0 | 10.0 | 1.0 | 100 | 10.0 |
| n-Octyl | .75 | 2.5 | 5.0 | 25 | 1.0 | 100 | 10 |
| | 2.5 | 2.5 | 5.0 | 50 | 1.0 | 1000 | 10 |
| 2-ethylhexyl | 0.50 | 1.0 | 2.5 | 7.5 | 10 | 100 | 10 |
| | 2.5 | 5 | 2.5 | 10 | 10 | 100 | 10 |
| n-Butyl | 2.5 | 5 | 5 | >100 | 100 | >100 | 100 |
| | 25 | 7.5 | 5 | | 100 | | 100 |

Thus, for example, the n-hexyl species is 10 times more active as a bacteriostatic agent and 25 times more active as a bactericidal agent than the old n-butyl species against *Staph. aureus*.

Some of our compounds, for instance 1,1'-hexamethylenebis[5-(2-ethylhexyl)biguanide] and its acid-addition salts are especially useful for imparting an antibacterial and antifungal finish to cotton cloth.

Moreover some of the compounds of this invention are active against influenza virus and some have anthelimintic activity, particularly against the species *Strongyloides ratti*.

In addition, the higher alkyl-substituted compounds of Formula I wherein R has from about 12 to about 16 atoms in the chain are useful as skin and hair conditioners.

Some of the compounds of this invention have been found of particular value in the agricultural field, for instance in the control of phytopathogenic microorganisms. For example in standard tests as foliar and systemic plant fungicides and bactericides they have been found active against such plant diseases as late blight (*Phytophthora infestans*) and bacterial spot (*Xantomonas vesicatoria*) on tomatoes (*Lycopersicon esculentum*), bean rust (*Uromyces phaseoli typica*) on pinto beans (*Phaseolus vulgaris*), fire blight (*Erwinia amylovera*) on apples (*Malus sylvestria*), and wildfire disease of tobacco (*Pseudomonas tabaci*) on tobacco (*Nicotinia tabacum*).

For example, each test compound, in testing for foliar fungicidal and antibacterial activity, was formulated as a wettable powder containing 25 percent of the test compound and this powder was diluted with water to the desired degree, for instance to yield a solution or suspension containing a selected number (usually 150 in the initial trials) of parts per million of the test compound, and the test plants were sprayed with the resulting preparation. The plants were allowed to dry, and were then treated either with an aqueous suspension of spores of the appropriate pathogenic organism or, in the cases of bean rust and wheat powdery mildew, the spores were dusted over the test plants. After a predetermined time, two to fourteen days, depending on the pathogenic organism, the plants were examined, a count being made of the number of lesions present per leaf or per unit area of leaf surface, or a quantitative visual estimate being made of the degree of infection. The degree of control of the pathogenic test organism was ordinarily determined by comparing the leaves of the treated plants with the leaves of untreated control plants.

In testing for systemic effectiveness in protecting plants against attack by pathogens at points different from the point of application of the test compound, the roots of bean plants, washed free of soil, were placed in small flasks containing the test compound at a concentration of 150 parts per million. After one day, each leaf was inoculated with the fungus causing bean rust disease. When the disease develops, generally in seven to ten days, the percent control relative to untreated plants was calculated. Any reduction in the number of lesions indicated absorption and translocation of the test compound to the foliage.

The preferred species of our invention for control of phytopathogenic microorganisms in plants, and particularly as plant fungicides and bactericides, are 1,1'-hexamethylene - bis[5-hexylbiguanide], 1,1'-hexamethylenebis [5-(n-octyl)-biguanide], 1,1'-hexamethylenebis[5-(n-heptyl)biguanide], and, especially, 1,1'-hexamethylenebis[5-(2-ethylhexyl)-biguanide]. It has been found advantageous to use these compounds for this purpose in the form of certain of their acid-addition salts, the following being particularly preferred: dihydrochloride; dihydrobromide; disaccharin salt; diacetate; dinitrate; succinate; citrate; diethanesulfonate; dipropionate; and dilactate. For example, 1,1' - hexamethylene-bis[5-(2-ethylhexyl)biguanide] disaccharin salt showed special advantage in seven-day residual foliar antifungal protectant tests.

The examples that follow will further illustrate the invention without limiting the latter thereto. The chemical structures of the compounds of this invention are established by their modes of preparation and confirmed by their infrared spectral data and elemental analyses.

EXAMPLE 1

1,1'-hexamethylenebis[5-hexylbiguanide]

A mixture of 25 g. (0.1 mol) of 1,1'-hexamethylenebis[3-cyanoguanidine] and 27.6 g. (0.2 mols) of n-hexylamine hydrochloride was heated with stirring in a wax bath maintained at 150 to 155° for four hours. The clear melt that first formed partially solidified after about three hours. After cooling, the mixture was broken up and was dissolved in 75 ml. of boiling water. The aqueous solution was treated with activated charcoal and filtered. On cooling, a white pasty mass, consisting of impure 1,1'-hexamethylenebis[5-hexylbiguanide] in the form of its dihydrochloride salt was collected. Repeated recrystallization from ethanol-ethyl acetate gave pure 1,1'-hexamethylenebis[5-hexylbiguanide] dihydrochloride which melted at 193.7–196.1° C. (corr.).

The free base form of 1,1'-hexamethylenebis[5-hexylbiguanide] is prepared by dissolving the dihydrochloride salt form in ethyl alcohol and adding to the solution two molecular equivalents of sodium hydroxide, pouring the resulting mixture into about five times its volume of water, and collecting the product.

The diacetate salt form of 1,1'-hexamethylenebis[5-hexylbiguanide] is prepared from the free base form by interacting the latter with two molecular equivalents of acetic acid.

EXAMPLE 2

1,1'-hexamethylenebis[5-(n-heptyl)biguanide]

Following the procedure given in Example 1, 25 grams (0.1 mol) of 1,1'-hexamethylenebis[3-cyanoguanidine] was caused to react with 30.4 grams (0.2 mol) of n-heptylamine hydrochloride. Recrystallized from boiling water, the pure 1,1'-hexamethylenebis[5-(n-heptyl)biguanide] in the form of its dihydrochloride salt thus prepared melted at 187.6–191.6° C. (corr.).

By converting a portion of this dihydrochloride to the free base and interaction with two equivalents of saccharin there was obtained the disaccharin salt, $C_{24}H_{52}N_{10} \cdot 2C_7H_5NO_3S$ a white powder which melted at 152–157° C.

EXAMPLE 3

1,1'-hexamethylenebis[5-(n-octyl)biguanide]

Following the procedure given in Example 1, 22.2 grams (0.09 mol) of 1,1' - hexamethylenebis[3 - cyanoguanidine] was caused to react with 29.4 grams (0.18 mol) of n-octylamine hydrochloride. Recrystallized from boiling water, the pure 1,1'-hexamethylenebis[5-(n-octyl)biguanide] in the form of its dihydrochloride salt thus prepared melted at 180.6–185.4° C. (corr.).

EXAMPLE 4

1,1'-hexamethylenebis[5-(2-ethylhexyl)biguanide]

A. Following the procedure given in Example 1, 16 grams (0.06 mol) of 1,1'-hexamethylenebis[3-cyanoguanidine] was caused to react with 20 grams (0.12 mol) of 2-ethylhexylamine hydrochloride. Recrystallized from methanol - ether the pure 1,1' - hexamethylenebis[5-(2-ethylhexyl)biguanide] in the form of its dihydrochloride salt thus prepared melted at 220.6–223.4° C. (corr.).

The free base form of 1,1'-hexamethylenebis[5-(2-ethylhexyl(biguanide] is prepared by dissolving the dihydrochloride salt form in ethyl alcohol and adding to the solution two molecular equivalents of sodoium hydroxide, pouring the resulting mixture into about five times its volume of water, and collecting the product.

By interaction of this base, $C_{26}H_{56}N_{10}$, with two equivalents each of the appropriate acids, the following acid-addition salts of 1,1'-hexamethylenebis[5-(2-ethylhexyl) biguanide] were prepared:

Dihydrobromide, $C_{26}H_{56}N_{10} \cdot 2HBr$, an off-white powder which melted at 185–186.8° C. (corr.).

Dicyclohexanesulfamate, $C_{26}H_{56}N_{10} \cdot 2C_6H_{13}NO_3S$, a white powder which melted at 111.0–132.0° C. (corr.).

Disaccharin salt, $C_{26}H_{56}N_{10} \cdot 2C_7H_5NO_3S$, a white powder which melted at 79.4–92.8° C. (corr.).

L-tartrate, $C_{26}H_{56}N_{10} \cdot C_4H_6O_6$, an off-white powder which melted at 94–104.0° C. (corr.).

Diacetate, $C_{26}H_{56}N_{10} \cdot 2C_2H_4O_2$, a tan glass which melted at 45–75° C. (uncorr.).

Sulfate, $C_{26}H_{56}N_{10} \cdot H_2SO_4$, a cream colored powder which melted at 180-indefinite° C. (uncorr.).

Di[2,2'-thiobis(4,6-dichlorophenolate)], $C_{26}H_{56}N_{10} \cdot 2C_{12}H_6Cl_4O_2S$, a yellow glass.

Pamoate, $C_{26}H_{56}N_{10} \cdot C_{23}H_{16}O_6$, a tan powder which melted at 100–106° C. (uncorr.).

Phthalate, $C_{26}H_{56}N_{10} \cdot C_8H_6O_4$, a pale yellow glass which melted at 98–106° C. (uncorr.).

Succinate, $C_{26}H_{56}N_{10} \cdot C_4H_6O_4$, a white powder which melted at 201–203° C. (uncorr.).

Citrate, $3C_{26}H_{56}N_{10} \cdot 2C_6H_8O_7$, a pale yellow glass which melted at 84–90° C. (uncorr.).

Diethanesulfonate, $C_{26}H_{56}N_{10} \cdot 2C_2H_6O_3S$, a tacky amber glass.

Dipropionate, $C_{26}H_{56}N_{10} \cdot 2C_3H_6O_2$, a tacky amber glass.

Di(3,4',5-tribromosalicylanilide) salt, $C_{26}H_{56}N_{10} \cdot 2(C_{13}H_8Br_3NO_2)$, a red oil.

Di(10-undecenoate), $C_{26}H_{56}N_{10} \cdot 2C_{11}H_{20}O_2$, an amber glass.

Di(4,4'-dibromo-6-chloro-2,2'-thiodiphenolate), $C_{20}H_{56}N_{10} \cdot 2C_{12}H_7Br_2ClO_2S$, a light brown glass which melted at 65–75° C. (uncorr.).

Di(4 - chloro - 3,5 - xylenolate), $C_{26}H_{56}N_{10} \cdot 2C_8H_9ClO$, a light brown glass, which melted at 110–119° C. (uncorr.).

Di(2-chloro-4-hexylphenolate), $C_{26}H_{56}N_{10} \cdot 2C_{12}H_{17}ClO$, an amber glass.

Di[2,2'-thiobis(3,4,6-trichlorophenolate)], $C_{26}H_{56}N_{10} \cdot 2C_{12}H_4Cl_6O_2S$, a light red glass which melted at 64–74° C. (uncorr.).

Di(3,4-dimethoxybenzoate), $C_{26}H_{56}N_{10} \cdot 2C_9H_{10}O_4$, a yellow glass which melted at 56–65° C. (uncorr.).

2-(2-hydroxy-3-hydroxymethyl-5-chlorobenzyl)-4,6-dichlorophenolate, $C_{26}H_{56}N_{10} \cdot 2C_{14}H_{11}Cl_3O_3$, a light brown glass which melted at 62–75° C. (uncorr.).

Di<o-{4-chloro-3-[m-nitrophenyl)ureido]benzoyl}-benzoate>, $C_{26}H_{56}N_{10} \cdot 2C_{21}H_{14}ClN_3O_6$, a brown glass.

Di(1-hydroxypyridine-2(1H)-thione, $C_{26}H_{56}N_{10} \cdot 2C_5H_5NOS$, a grey-brown glass.

Di(dodecylsulfate), $C_{26}H_{56}N_{10} \cdot 2C_{12}H_{26}O_4S$, an off-white gum.

Di(p-dodecylbenzenesulfonate), $C_{26}H_{56}N_{10} \cdot 2C_{18}H_{30}O_3S$, an off-white powder which melted at 102–105° C. (uncorr.).

Dilactate, $C_{26}H_{56}N_{10} \cdot 2C_3H_6O_3$, an oil.

Di(p-toluenesulfonate), $C_{26}H_{56}N_{10} \cdot 2C_7H_8O_3S$, an amber glass.

Dinitrate, $C_{36}H_{56}N_{10} \cdot 2HNO_3$, a white powder which melted at 116–118° C. (uncorr.).

B. Cotton cloth was drawn through a 0.5 percent solution of 1,1'-hexamethylenebis[5-(2-ethylhexyl)biguanide] dihydrochloride in ethyl alcohol and was passed through a set of squeeze rolls which left on the cloth a weight of the solution amounting to 70 percent of the weight of the dry cloth. The wet cloth was then heated in an oven at 160° F. until dry. The cloth thus treated was then tested by the method described by Paul A. Majors in the American Dyestuff Reporter 48, No. 3, pp. 91–93 (1959) and was found to have an antibacterial coating which was highly resistant to both washing and bleaching, and still had effective antibacterial activity against *Staphylococcus aureus* after twenty washes with water containing a commercial anionic washing detergent.

C. In addition to having superior antibacterial and antifungal activity, as indicated in the table supra, 1,1'-hexamethylenebis[5-(2-ethylhexyl)biguanide] was found to be effective in combatting *Strongyloides ratti* infections in rats when the drug was given orally as the hydrochloride salt in doses of 50 mg./kg. per day for 5 days.

D. Moreover, as indicated hereinabove, 1,1'-hexamethylenebis[5-(2-ethylhexyl)biguanide] in the form of its acid-addition salts showed outstanding value in the control of plant pathogens.

EXAMPLE 5

1,1'-hexamethylenebis[5-(1,1,3,3-tetramethylbutyl)biguanide]

Following the procedure in Example 1, but substituting for the n-hexylamine hydrochloride an equivalent amount of 1,1,3,3-tetramethylbutylamine, there is obtained as the reaction product 1,1'-hexamethylenebis[5-(1,1,3,3-tetramethylbutyl)biguanide] in the form of its dihydrochloride salt.

EXAMPLE 6

1,1'-hexamethylenebis[5-(2-ethylhexyl)biguanide]-cobalt complex

To a solution containing 5.0 grams of 1,1'-hexamethylenebis[5-(2-ethylhexyl)biguanide] dihydrochloride (Example 4) in 250 ml. of water was added 6 ml. of 35% sodium hydroxide solution and the mixture was heated on a steam bath. A solution containing 5 grams of cobalt(II) nitrate hexahydrate in 250 ml. of water was added dropwise, and after the addition was complete, the resulting mixture was heated for another half hour and allowed to cool. The resulting precipitate appeared to be a mixture of two solids. The mixture was made acidic with dilute hydrochloric acid and the remaining solid was removed by filtration and washed with water. The 1,1'-hexamethylenebis[5-(2-ethylhexyl) biguanide] cobalt complex containing a ratio of 3 molecules of bis(biguanide) to two cobalt(II) ions, thus prepared, was not meltable at 300° C.

EXAMPLE 7

1,1'-hexamethylenebis[5-dodecylbiguanide]

Following the procedure given in Example 1, 20.3 grams (0.0817 mol) of 1,1'-hexamethylenebis[3-cyanoguanidine] was caused to react with 35.6 grams (0.16 mol) of n-dodecylamine hydrochloride. Recrystallized from methanol-ether and from water, the pure 1,1'-hexamethylenebis[5-dodecylbiguanide] in the form of its dihydrochloride salt thus prepared melted at 189.8–191.8° C. (corr.).

EXAMPLE 8

1,1'-hexamethylenebis[5-decylbiguanide]

Following the procedure given in Example 1, 24.2 grams (0.097 mol) of 1,1'-hexamethylenebis[3-cyanoguanidine] was caused to react with 30 grams (0.155 mol) of decylamine hydrochloride. Recrystallized from methanol-ether and from ethanol the pure 1,1'-hexamethylenebis[5-decylbiguanide] in the form of its dihydrochloride salt thus prepared melted at 180.0–183.0° C. (corr.).

EXAMPLE 9

1,1'-hexamethylenebis[5-nonylbiguanide]

Following the procedure given in Example 1, 20.2 grams (0.08 mol) of 1,1'-hexamethylenebis[3-cyanoguanidine] was caused to react with 29 grams (0.16 mol) of n-nonylamine hydrochloride. Recrystallized from ethanol the pure 1,1'-hexamethylenebis[5-nonylbiguanide] in the form of its dihydrochloride salt thus prepared melted at 184.0–186.0° C. (corr.).

EXAMPLE 10

1,1'-hexamethylenebis[3-hexylguanidine]

To a suspension of 12.0 grams of hexylthiourea in 20 ml. of absolute alcohol was added dropwise and with stirring 13.0 grams of ethyl iodide. After the addition was complete, the mixture was refluxed for eight hours. The solvent was removed under reduced pressure and the residue consisting of S-ethyl-N-hexylisothiuronium iodide, was dissolved in 20 ml. of isoamyl alcohol. To the solution was added 4.4 grams of hexamethylenediamine, and the resulting solution was refluxed for three hours. The solvent was removed under reduced pressure leaving an oily residue consisting of crude 1,1'-hexamethylenebis[hexylguanidine] as the dihydriodide salt. The crude dihydriodide was dissolved in 150 ml. of ethanol and was passed through a column containing commercial chloride ion exchange resin. The solvent was removed from the eluate and the residue, consisting of 1,1'-hexamethylenebis[3-hexylguanidine] as the hydrochloride was recrystallized from ethanol-chloroform. This salt form melted at 161–164° C.

1,1'-hexamethylenebis[3-hexylguanidine] in the form of its hydrochloride salt had bactericidal (Bc) and bacteriostatic (Bs) activities at the following concentrations.

Bs/Bc in parts per million (in vitro):
    Staph. aureus _____ 2.5/50
    E. typhi _____ 50/50
    Cl. welchii _____ 10/10
    Ps. aeruginosa _____ >100/—

EXAMPLE 11

1,1'-hexamethylenebis[3-octylguanidine]

Following the procedure given in Example 10, N-octyl-S-ethylisothiuronium iodide (obtained from N-octyl thiourea and ethyl iodide) was caused to react with hexamethylenediamine in ethanol. The resulting 1,1'-hexamethylenebis[3-octylguanidine] in the form of the hydriodide salt dissolved in ethanol was passed through a column containing chloride-ion exchange resin. The resulting 1,1'-hexamethylenebis[3-octylguanidine] as the hydrochloride salt, recrystallized from ethanol-ethyl acetate, melted at 173–176° C.

1,1'-hexamethylenebis[3-octylguanidine] in the form of its hydrochloride salt had bactericidal (Bc) and bacteriostatic (Bs) activities at the following concentrations.

Bs/Bc in parts per million (in vitro):
| | |
|---|---|
| Staph. aureus | .75/5 |
| E. typhi | 5/5 |
| Cl. welchii | 2.5/2.5 |
| Ps. aeruginosa | 25/50 |

This compound also showed useful activity as a foliar fungicide.

EXAMPLE 12

1,1'-hexamethylenebis[3-decylguanidine]

Following the procedure given in Example 10, N-decyl-S-ethylisothiuronium iodide (obtained from N-decyl thiourea and ethyl iodide) was caused to react with hexamethylenediamine in ethanol. The product, 1,1'-hexamethylenebis[3-decylguanidine] in the form of the hydriodide salt was converted to the hydrochloride salt form by treatment with a chloride ion exchange resin. The resulting 1,1'-hexamethylenebis[3-decylguanidine] as the hydrochloride, recrystallized from ethanol-ethyl acetate melted at 184–186° C.

1,1'-hexamethylenebis[3-decylguanidine] in the form of its hydrochloride salt had bactericidal (Bc) and bacteriostatic (Bs) activities at the following concentrations.

Bs/Bc in parts per million (in vitro):
| | |
|---|---|
| Staph. aureus | 2.5/7.5 |
| E. typhi | 5/10 |
| Cl. welchii | 7.5/7.5 |
| Ps. aeruginosa | 75/100 |

According to the procedure given in Example 1, the following compounds can also be prepared from 1,1'-hexamethylenebis[3-cyanoguanidine] and the indicated amine:

1,1'-hexamethylenebis[5-(2-ethoxyethyl)biguanide] as the dihydrochloride from 2-ethoxyethylamine hydrochloride.

1,1'-hexamethylenebis[5 - (3 - isobutoxypropyl)biguanide] as the dihydrochloride from 3-isobutoxypropylamine hydrochloride.

1,1'-hexamethylenebis[5-(3-isopropylmercaptopropyl)-biguanide] as the dihydrochloride from 3-isopropylmercaptopropylamine hydrochloride. The latter can be prepared from isopropylmercaptan and acrylonitrile, followed by reduction of the resulting β-isopropylmercaptopropionitrile with hydrogen over Raney nickel, followed by addition of hydrochloric acid.

1,1'-hexamethylenebis[5-(6 - methylmercaptohexyl)-biguanide] as the dihydrochloride from 6-methylmercaptohexylamine hydrochloride.

1,1' - hexamethylenebis[5-(7 - methylmercaptoheptyl)-biguanide] as the dihydrochloride from 7-methylmercaptoheptylamine hydrochloride.

1,1' - hexamethylenebis[5-(4-pentylmercaptobutyl)-biguanide] as the dihydrochloride from 4-pentylmercaptobutylamine hydrochloride.

1,1' - hexamethylenebis[5-(8-methylmercaptooctyl)-biguanide] as the dihydrochloride from 8-methylmercaptooctylamine hydrochloride.

1,1' - hexamethylenebis[5-(2-hexyloxy-1-methylethyl)-biguanide] as the dihydrochloride from 2-hexyloxy-1-methylethylamine hydrochloride.

1,1' - hexamethylenebis[5-(2-propyloxy-1-methylethyl)-biguanide] as the dihydrochloride from 4-propyloxy-1-methylethylamine hydrochloride.

1,1' - hexamethylenebis[5-(4-propyloxy-1-methylbutyl)-biguanide] as the dihydrochloride from 4-propyloxy-1-methylbutylamine hydrochloride.

1,1' - hexamethylenebis[5-(7-methoxyheptyl)biguanide] as the dihydrochloride from 7-methoxyheptylamine hydrochloride.

1,1' - hexamethylenebis[5-(3-isopropoxypropyl)biguanide] as the dihydrochloride from 3-isopropoxypropylamine hydrochloride.

1,1' - hexamethylenebis[5-(3-propoxypropyl)biguanide] as the dihydrochloride from 3-propyloxypropylamine hydrochloride.

1,1'-hexamethylenebis[5-hexadecylbiguanide] as the dihydrochloride from hexadecylamine hydrochloride.

1,1'-hexamethylenebis[5-tetradecylbiguanide] as the dihydrochloride salt from tetradecylamine hydrochloride.

1,1' - hexamethylenebis[5-(4,8,12 - trimethyltridecyl)-biguanide] as the hydrochloride salt from 4,8,12-trimethyltridecylamine hydrochloride.

According to the procedure given in Example 1, the following compounds can be prepared from the indicated bridged-cyanoguanidine and the indicated amine hydrochloride:

1,1'-(2-methyl - 1,4 - butylene)bis[5-heptylbiguanide] dihydrochloride from n-heptylamine hydrochloride and 1,1'-(2-methyl-1,4-butylene)bis(3-cyanoguanidine), which in turn is obtainable from 2-methyl-1,4-butylenediamine dihydrochloride and sodium dicyanamide.

1,1' - (p-xylylene)bis[5-(2-ethylhexyl)biguanide] dihydrochloride from 2-ethylhexylamine hydrochloride and 1,1'-(p-xylylene)bis(3-cyanoguanidine), which in turn is obtainable from p-xylylenediamine dihydrochloride and sodium dicyanamide.

1,1' - (2,3,5,6-tetrachloro - p - xylylene)bis[5-(2-ethylhexyl)biguanide] dihydrochloride from 2-ethylhexylamine hydrochloride and 1,1'-(2,3,5,6 - tetrachloro-p-xylylene)bis(3-cyanoguanidine), which in turn is obtainable from α,α'-diamino-2,3,5,6-tetrachloro-p-xylene dihydrochloride and sodium dicyanamide.

1,1' - octamethylenebis[5-hexyl-5-methylbiguanide] dihydrochloride from 1,1'-octamethylenebis[3-cyanoguanidine] and N-hexyl-N-methylamine hydrochloride.

1,1'-(2,3,5,6-tetramethyl - p - xylylene)bis[5-(2-ethylhexyl)biguanide] dihydrochloride from 2-ethylhexylamine hydrochloride and 1,1'-(2,3,5,6 - tetramethyl-p-xylylene)bis(3-cyanoguanidine), which in turn is obtainable from 2,3,5,6-tetramethyl - p - xylylenediamine dihydrochloride and sodium dicyanamide.

1,1' - (2-chloro-p-xylylene)bis[5-octylbiguanide] dihydrochloride from octylamine hydrochloride and 1,1'-(2-chloro-p-xylylene)bis(3-cyanoguanidine), which in turn is obtainable from 2-chloro-p-xylylenediamine dihydrochloride and sodium dicyanamide.

1,1' - [p-phenylenebis(ethylene)]bis[5-octylbiguanide] dihydrochloride from octylamine dihydrochloride and 1,1'-[(p - phenylene)bis(ethylene)]bis(3 - cyanoguanidine), which in turn is obtainable from p-phenylenebis (β,β'-ethylamine) dihydrochloride and sodium dicyanamide.

1,1' - [oxybis(p-phenylene)]bis[5-octylbiguanide] dihydrochloride from octylamine hydrochloride and 1,1'-[oxybis(phenylene)]bis[3-cyanoguanidine], which in turn is obtainable from oxybis(p-phenylene)diamine dihydrochloride and sodium dicyanamide.

1,1'-oxybis[propylene]bis[5-ethyl - 5 - (1,3-dimethyl-3-methylmercaptobutyl)biguanide] dihydrochloride from 1,1' - oxybis[propylene]bis[3 - cyanoguanidine] and N-ethyl-N-(1,3 - dimethyl-3-methylmercaptobutyl)amine hydrochloride.

1,1' - oxybis[propylene]bis[5 - methyl - 5 - (1-ethyl-2-methylmercaptopropyl)biguanide] dihydrochloride from 1,1' - oxybis[propylene]bis[3 - cyanoguanidine] and N-methyl-N-(1-ethyl-2-methylmercaptopropyl)amine hydrochloride.

1,1'-oxybis[propylene]bis[5-ethyl - 5 - hexylbiguanide] dihydrochloride from 1,1'-oxybis[propylene]bis[3-cyanoguanidine] and N-ethyl-N-hexylamine hydrochloride.

The following compounds of the invention can be prepared by refluxing for several hours a mixture of the indicated substituted cyanoguanidine, the indicated bridged diamine, and pyridine hydrochloride, using pyridine as a solvent medium, then cooling the reaction medium, and collecting the product which separates from solution.

1,1'-[2,5-dimethyl - p - phenylenebis(ethylene)]bis[5- hexylbiguanide] dihydrochloride from 1-hexyl-3-cyanoguanidine and 2,2'-(2,5-dimethyl-p-phenylene)bis[ethylamine] dihydrochloride.

1,1'-[phenylenebis(1-methylethylene)]bis[5-hexylbiguanide] dihydrochloride from 1-hexyl-3-cyanoguanidine and 2,2'-(phenylene)bis[1-methylethylamine] dihydrochloride.

1,1'-[1,4-cyclohexanebis(methylene)]bis[5-hexylbiguanide] dihydrochloride from 1-hexyl-3-cyanoguanidine and 1,4-cyclohexanebis(methylamine) dihydrochloride 1,1'-thiobis[p-phenylene]bis[5-octylbiguanide] dihydrochloride from 1-octyl-3-cyanoguanidine and 4,4'-thiobis[aniline] dihydrochloride 1,1'-sulfinylbis[p-phenylene]bis[5-octylbiguanide] dihydrochloride from 1-octyl-3-cyanoguanidine and 4,4'-sulfinylbis[aniline] dihydrochloride 1,1'-sulfonylbis[p-phenylene]bis[5-octylbiguanide] as the dihydrochloride salt from 1-octyl-3-cyanoguanidine and 4,4'-sulfonylbis[aniline] dihydrochloride.

1,1'-(4,4'-stilbene)bis[5-octylbiguanide] as the dihydrochloride salt from 1-octyl-3-cyanoguanidine and 4,4'-stilbenediamine dihydrochloride.

1,1'-(1,3-xylylene)bis[5-octylbiguanide] as the dihydrochloride salt from 1-octyl-3-cyanoguanidine and 1,3-xylylenediamine dihydrochloride.

1,1'-(1,2-xylylene)bis[5-octylbiguanide] as the dihydrochloride salt from 1-octyl-3-cyanoguanidine and 1,2-xylylenediamine dihydrochloride.

1,1'-thiobis[ethylene]bis[5-octylbiguanide] as the dihydrochloride salt from 1-octyl-3-cyanoguanidine and 2,2'-thiobis[ethylamine] hydrochloride.

1,1'-thiobis[propylene]bis[5-octylbiguanide] as the dihydrochloride salt from 1-octyl-3-cyanoguanidine and 3,3'-thiobis[propylamine] hydrochloride.

1,1'-oxybis[butylene]bis[5-octylbiguanide] as the dihydrochloride salt from 1-octyl-3-cyanoguanidine and 4,4'-oxybis[butylamine] hydrochloride.

The following compounds are prepared according to the procedure given in Example 10, using the appropriate bridged diamine in place of hexamethylenediamine:

1,1'-octamethylenebis[3-hexylguanidine] as the hydroiodide salt from octamethylenediamine.

1,1'-decamethylenebis[3-hexylguanidine] as the hydroiodide salt from decamethylenediamine.

1,1'-dodecamethylenebis[3-hexylguanidine] as the hydriodide salt from dodecamethylenediamine.

1,1'-ethylenebis[3-hexylguanidine] as the hydriodide salt from ethylenediamine.

1,1'-[α,α'-(1,4-xylylene)]bis[3-hexylguanidine] as the hydriodide salt from α,α'-(1,4-xylylenediamine).

1,1'-[1,4-cyclohexanebis(methylene)]bis[3-hexylguanidine] as the hydriodide salt from 1,4-cyclohexanebis-(methylamine).

1,1'-[1,4-phenylenebis(ethylene)bis[3-hexylguanidine] as the hydrochloride salt from 1,4-phenylenebis[ethyleneamine] followed by ion exchange on a chloride ion exchange resin.

1,1'-oxybis(1,4-phenylene)bis[3-hexylguanidine] as the hydrochloride salt from 4,4'-oxybis[aniline] followed by ion exchange in a chloride ion exchange resin.

1,1'-[α,α'-(2,3,5,6-tetrachloro-1,4-xylylene)]bis-[3-hexylguanidine] as the hydriodide salt from 2,3,5,6-tetrachloro-1,4-xylylenediamine.

1,1'-[2-methyl-1,5-pentylene]bis[3-hexylguanidine] as the hydriodide salt from 2-methyl-1,5-pentylenediamine.

1,1'-[α,α'-(2-methyl-1,4-xylylene)]bis[3hexylguanidine] as the hydriodide salt from 2-methyl-1,4-xylylenediamine.

1,1'-oxybis[ethylene]bis[3-hexylguanidine] as the hydriodide salt from oxybis[ethylamine].

1,1'-thiobis[ethylene]bis[3-hexylguanidine] as the hydriodide salt from thiobis[ethylamine].

1,1'-(4,4'-stilbene)bis[3-hexylguanidine] as the hydriodide salt from 4,4'-stilbenediamine.

1,1'-(1,3-xylylene)bis[3-hexylguanidine] as the hydriodide salt from 1,3-xylylenediamine.

The following compounds are also prepared according to the manipulative procedure given in Example 10, using the appropriate N-substituted-S-alkyl isothiuronium halide in place of N-hexyl-S-ethyl-isothiuronium iodide:

1,1'-hexamethylenebis[3-dodecylguanidine] as the hydrobromide salt from N-dodecyl-S-butylisothiouronium bromide obtained from N-dodecylthiourea and butyl bromide.

1,1'-hexamethylenebis[3-(1,1,3,3-tetramethylbutyl)-guanidine] as the hydriodide salt from N-(1,1,3,3-tetramethylbutyl)-S-ethylisothiuronium iodide obtained from N-(1,1,3,3-tetramethylbutyl)thiourea and ethyl iodide.

1,1'-hexamethylenebis[3-(5-methylmercaptopentyl)-guanidine] as the hydriodide salt from N-(5-methylmercaptopentyl-S-methylisothiuronium iodide obtained from N-(5-methylmercaptopentyl) thiourea and methyl iodide.

The following compounds are also prepared according to the manipulative procedure given in Example 10, using the indicated starting materials:

1,1'-sulfonylbis[1,4-phenylene]bis[3-(3-isobutoxypropyl)guanidine] as the hydriodide salt from sulfonylbis-(1,4-phenylene)diamine and N-[3-(isobutoxy)propyl]-S-ethylisothiuronium iodide, obtained from ethyl iodide and N-(3-isobutoxypropyl)thiourea, which is obtained from ammonia and 3-(isobutoxy)propylisothiocyanate, which in turn is obtained from 3-(isobutoxy)propylamine and thiophosgene.

1,1'-sulfinylbis[1,4-phenylene]bis[3-(3-isopropylmercapto)propylguanidine] as the hydriodide salt from sulfinylbis(1,4-phenylene)diamine and N-[3-(isopropylmercapto)-propyl]-S-ethylisothiuronium iodide obtained from ethyl iodide and N-(3-isopropylmercaptopropyl)thiourea, which is obtained from ammonia and 3-isopropylmercaptopropylisothiocyanate, which in turn is obtained from 3-isopropylmercaptopropylamine and thiophosgene.

1,1'-thiobis[1,4-phenylene]bis[3-(7-methoxyheptyl)-guanidine] as the hydriodide salt from thiobis(1,4-phenylene)-diamine and N-(7-methoxyheptyl-S-ethylisothiuronium iodide, which is obtained from ethyl iodide and N-(7-methoxyheptyl)-thiourea, which is obtained from ammonia and 7-methoxyheptylisothiocyanate, which in turn is obtained from 7-methoxyheptylamine and thiophosgene.

1,1'-hexamethylenebis[3-methyl-3-hexylguanidine] as the hydriodide salt from N-methyl-N-hexylamine and 1,1'-hexamethylenebis[2-ethylisothiuronium iodide], which is obtained from 1,1'-hexamethylenebis(thiourea) and 2 molecular equivalents of ethyl iodide.

1,1'-octamethylenebis[3-hexadecylguanidine] as the hydrobromide salt from octamethylene diamine and N-hexadecyl-S-butylisothiuronium bromide, obtained from N-hexadecylthiourea and butyl bromide.

We claim:
1. A member selected from the group consisting of a compound of the formula

$$R-N\begin{pmatrix} NH \\ \| \\ -C-NH- \end{pmatrix}_x -A- \begin{pmatrix} NH \\ \| \\ -NH-C- \end{pmatrix}_x -N-R$$
$$\hspace{0.5cm} R' \hspace{5.5cm} R'$$

wherein:

A is a member of the group consisting of:
(a) alkylene of from 2 to 12 carbon atoms, having the valence bonds attached to different carbon atoms,
(b) —(CH$_2$)$_m$—Y—(CH$_2$)$_n$— wherein $m$ and $n$ each represent an integer from 2 to 6 and Y is a member of the group consisting of O and S, (c) 
$$-CH_2-CH\begin{matrix} CH_2-CH_2 \\ \diagup \hspace{1cm} \diagdown \\ \diagdown \hspace{1cm} \diagup \\ CH_2-CH_2 \end{matrix}CH-CH_2-$$

(d)
$$-Z-\!\!\!\bigcirc\!\!\!-Z'-$$

wherein Z and Z' are alkylene of from 1 to 3 carbon atoms, (e) 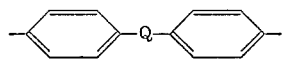

wherein Q is a member of the group consisting of O, S, SO, and $SO_2$, and (f) 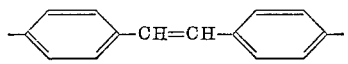

R is a member of the group consisting of:
   (a) alkyl having from 6–16 carbon atoms and
   (b) alkyl-Y-alkylene having from 5–15 carbon atoms, wherein Y is a member of the group consisting of O and S, R' is a member of the group consisting of H and lower-alkyl; and $x$ is an integer from 1 to 2; and acid addition salts thereof.

2. A compound of the formula

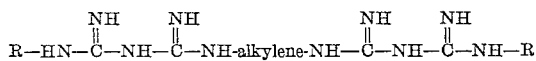

according to claim 1.

3. 1,1' - hexamethylenebis(5 - alkylbiguanide), according to claim 2.

4. 1,1' - hexamethylenebis(5 - alkylbiguanide) according to claim 3 in the form of an acid-addition salt with two equivalents of hydrochloric acid, hydrobromic acid, saccharin, acetic acid, nitric acid, succinic acid, citric acid, ethanesulfonic acid, propionic acid, or lactic acid.

5. 1,1' - hexamethylenebis(5 - n - hexylbiguanide), according to claim 3.

6. 1,1' - hexamethylenebis(5 - n - heptylbiguanide), according to claim 3.

7. 1,1' - hexamethylenebis(5 - n - octylbiguanide), according to claim 3.

8. 1,1' - hexamethylenebis(5 - n - nonylbiguanide), according to claim 3.

9. 1,1' - hexamethylenebis(5 - n - decylbiguanide), according to claim 3.

10. 1.1' - hexamethylenebis(5 - n - dodecylbiguanide), according to claim 3.

11. 1,1' - hexamethylenebis[5 - (2 - ethylhexyl) - biguanide], according to claim 3.

12. 1,1' - hexamethylenebis[5 - (2 - ethylhexyl)biguanide] according to claim 11 in the form of its dihydrochloride.

13. 1,1' - hexamethylenebis [5 - (2 - ethylhexyl)biguanide] according to claim 11 in the form of its dihydrobromide.

14. 1,1' - hexamethylenebis[5 - (2 - ethylhexyl)biguanide] according to claim 11 in the form of its disaccharin salt.

15. 1,1' - hexamethylenebis[5 - (2 - ethylhexyl)biguanide] according to claim 11 in the form of its diacetate.

16. 1,1' - hexamethylenebis[5 - (2 - ethylhexyl)biguanide] according to claim 11 in the form of its dinitrate.

17. 1,1' - hexamethylenebis[5 - (2 - ethylhexyl) biguanide] according to claim 11 in the form of its succinate.

18. 1,1' - hexamethylenebis[5 - (2 - ethylhexyl)biguanide] according to claim 11 in the form of its citrate.

19. 1,1' - hexamethylenebis[5 - (2 - ethylhexyl)biguanide] according to claim 11 in the form of its diethanesulfonate.

20. 1,1' - hexamethylenebis[5 - (2 - ethylhexyl)biguanide] according to claim 11 in the form of its dipropionate.

21. 1,1' - hexamethylenebis[5 - (2 - ethylhexyl)biguanide] according to claim 11 in the form of its dilactate.

22. A compound of the formula

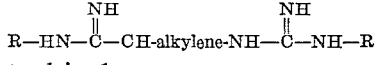

according to claim 1.

23. 1,1' - hexamethylenebis[3 - hexylguanidine], according to claim 22.

24. 1,1' - hexamethylenebis[3 - octylquanidine], according to claim 22.

25. 1,1' - hexamethylenebis[3 - decylguanidine], according to claim 22.

References Cited

UNITED STATES PATENTS

| | | | |
|---|---|---|---|
| 2,255,090 | 9/1941 | Tinker | 260—564 |
| 2,455,896 | 12/1948 | Nagy | 260—564 |

ALEX MAZEL, Primary Examiner

R. J. GALLAGHER, Assistant Examiner

U.S. Cl. X.R.

260—239.1, 240, 258, 295, 326.13, 347.5, 429.9, 438, 439, 444, 501.14, 564, 565; 424—270, 287, 289, 294, 295, 303, 311, 313, 326

PO-1050
(5/69)

UNITED STATES PATENT OFFICE
CERTIFICATE OF CORRECTION

Patent No. 3,468,898      Dated September 23, 1969

Inventor(s) Royal A. Cutler and Samuel Schalit

It is certified that error appears in the above-identified patent and that said Letters Patent are hereby corrected as shown below:

Column 1, line 17 "applicatiin" should read --application--. Column 1, line 56

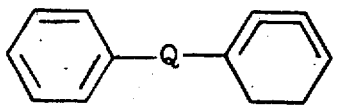

should read

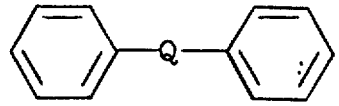

Column 1, line 64   CH—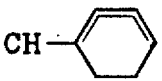 should read CH—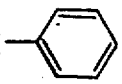

Column 10, line 29 "ethyl(biguanide]" should read --ethyl)biguanide]--. Column 10, line 68 "$C_{20}$" should read --$C_{26}$--. Column 11, line 8 "Di$<$o-" should read --Di$<$o- --. Column 11, line 8 "[m-" should read --[m- --. Column 11, line 14 "(p-" should read --(p- --. Column 11, line 64-65 "cobolt" should read --cobalt--. Column 12, line 5 "0.0817" should read --0.081--.

Column 17, line 42 "1.1' " should read --1,1'--.
Column 18, line 25 "C-CH-" should read --C-NH- --.

SIGNED AND
SEALED
OCT 13 1970

(SEAL)
Attest:

Edward M. Fletcher, Jr.
Attesting Officer

WILLIAM E. SCHUYLER, JR.
Commissioner of Patents